United States Patent
Kim et al.

(10) Patent No.: US 10,652,793 B2
(45) Date of Patent: May 12, 2020

(54) METHOD BY WHICH PGW PROCESSES DATA FOR UE IN WIRELESS COMMUNICATION SYSTEM, AND APPARATUS THEREFOR

(71) Applicant: LG ELECTRONICS INC., Seoul (KR)

(72) Inventors: Laeyoung Kim, Seoul (KR); Jaehyun Kim, Seoul (KR); Myungjune Youn, Seoul (KR); Dongsoo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/070,036

(22) PCT Filed: Jan. 16, 2017

(86) PCT No.: PCT/KR2017/000536
§ 371 (c)(1),
(2) Date: Jul. 13, 2018

(87) PCT Pub. No.: WO2017/123076
PCT Pub. Date: Jul. 20, 2017

(65) Prior Publication Data
US 2019/0021034 A1    Jan. 17, 2019

Related U.S. Application Data

(60) Provisional application No. 62/278,451, filed on Jan. 14, 2016.

(51) Int. Cl.
*H04W 36/12*    (2009.01)
*H04W 88/16*    (2009.01)
(Continued)

(52) U.S. Cl.
CPC ............. *H04W 36/12* (2013.01); *H04W 8/08* (2013.01); *H04W 36/02* (2013.01); *H04W 76/20* (2018.02);
(Continued)

(58) Field of Classification Search
CPC ....... H04W 36/12; H04W 8/08; H04W 76/27; H04W 76/20; H04W 36/02; H04W 88/16; H04W 68/00; H04W 36/34; H04W 84/042
See application file for complete search history.

(56) References Cited

U.S. PATENT DOCUMENTS 9,474,000 B2 * 10/2016 Kilpatrick, II .... H04W 36/0083
9,648,657 B2 *  5/2017 Pelletier ............ H04W 72/1221
(Continued)

FOREIGN PATENT DOCUMENTS

| EP | 2843885 A1 | 4/2015 |
| KR | 1020130090831 A | 8/2013 |
| WO | 2014173225 A1 | 10/2014 |

OTHER PUBLICATIONS

XP051071877: "3rd Generation Partnership Project; Technical Specification Group Services and System Aspects; General Packet Radio Service enhancements for Evolved Universal Terrestrial Radio Access Network access", 3GPP Draft; 23401-D50, 3rd Generation Partnership Project, Mobile Competence Centre; F-06921 Sophia-Antipolis Cedex; France; Dec. 15, 2015, pp. 1-338.

*Primary Examiner* — Mounir Moutaouakil
(74) *Attorney, Agent, or Firm* — Dentons US LLP

(57) ABSTRACT

One embodiment of the present invention relates to a method by which a packet data network gateway (PGW) processes data for an UE in a wireless communication system, the method comprising the steps of: receiving a tracking area identifier (TAI) list from a mobility management entity (MME); and receiving downlink data for the UE
(Continued)

from a network, wherein the PGW buffers the downlink data when all of the tracking areas (TAs), which belong to the TAI list, are not included in the same serving gateway (SGW) service region.

9 Claims, 9 Drawing Sheets

(51) Int. Cl.
    *H04W 36/02*     (2009.01)
    *H04W 76/20*     (2018.01)
    *H04W 76/27*     (2018.01)
    *H04W 8/08*     (2009.01)
    *H04W 68/00*     (2009.01)
    *H04W 36/34*     (2009.01)
    *H04W 84/04*     (2009.01)

(52) U.S. Cl.
    CPC ............ *H04W 76/27* (2018.02); *H04W 88/16* (2013.01); *H04W 36/34* (2013.01); *H04W 68/00* (2013.01); *H04W 84/042* (2013.01)

(56) References Cited

U.S. PATENT DOCUMENTS

| | | | |
|---|---|---|---|
| 9,872,269 B2 * | 1/2018 | Dakshayani | H04W 60/00 |
| 10,104,640 B2 * | 10/2018 | Laslo-Amit | H04W 8/02 |
| 10,321,358 B2 * | 6/2019 | Kim | H04L 5/00 |
| 2011/0310868 A1 * | 12/2011 | Yang | H04W 68/00 370/338 |
| 2012/0071173 A1 * | 3/2012 | Olsson | H04W 60/04 455/456.1 |
| 2013/0077592 A1 * | 3/2013 | Wang | H04W 76/28 370/329 |
| 2013/0121298 A1 * | 5/2013 | Rune | H04L 29/12066 370/329 |
| 2013/0201824 A1 * | 8/2013 | Venkatachalam | H04W 28/12 370/230 |
| 2013/0286821 A1 * | 10/2013 | Liu | H04W 88/16 370/225 |
| 2014/0044051 A1 | 2/2014 | Kamalaraj et al. | |
| 2014/0106790 A1 * | 4/2014 | Kakinada | H04W 68/02 455/458 |
| 2014/0126448 A1 * | 5/2014 | Punz | H04W 52/0219 370/311 |
| 2015/0036595 A1 | 2/2015 | Jin et al. | |
| 2015/0110121 A1 | 4/2015 | Tan et al. | |
| 2016/0007316 A1 * | 1/2016 | Vaidya | H04W 68/02 370/312 |
| 2016/0183156 A1 * | 6/2016 | Chin | H04W 36/0022 370/331 |
| 2017/0374542 A1 * | 12/2017 | Ryu | H04W 8/08 |
| 2018/0220289 A1 * | 8/2018 | Ryu | H04W 8/04 |

* cited by examiner

METHOD BY WHICH PGW PROCESSES DATA FOR UE IN WIRELESS COMMUNICATION SYSTEM, AND APPARATUS THEREFOR This application is a National Stage Application of International Application No. PCT/KR2017/000536, filed on Jan. 16, 2017, which claims the benefit of U.S. Provisional Application No. 62/278,451, filed on Jan. 14, 2016, all of which are hereby incorporated by reference in their entirety for all purposes as if fully set forth herein.

TECHNICAL FIELD

The following description relates to a wireless communication system, and more specifically, to a method and apparatus for processing data for a UE in a packet data network gateway (PGW).

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE

Technical Problem

An object of the present invention devised to solve the problem lies in an operation method for network nodes capable of efficiently coping with frequent change of SGWu.

It will be appreciated by persons skilled in the art that the objects that could be achieved with the present disclosure are not limited to what has been particularly described hereinabove and other objects that the present disclosure could achieve will be more clearly understood from the following detailed description.

Technical Solution

The object of the present invention can be achieved by providing a method for processing data for a user equipment (UE) by a packet data network gateway (PGW) in a wireless communication system, the method including receiving a tracking area identifier (TAI) list from a mobility management entity (MME), and receiving downlink data for the UE from a network, wherein the PGW buffers the downlink data when not all tracking areas (TAs) belonging to the TAI list are included in a same serving gateway (SGW) service area.

In another aspect of the present invention, provided herein is a packet data network gateway (PGW) for processing data for a user equipment (UE) in a wireless communication system, the PGW including a transceiver and a processor, wherein the processor is configured to receive, through the transceiver, a tracking area identifier (TA) list from an MME and downlink data for the UE from a network, wherein the PGW buffers the downlink data when not all tracking areas (TAs) belonging to the TAI list are included in a same serving gateway (SGW) service area.

The PGW may perform only a function of a user plane between a control plane and the user plane.

The PGW may transmit the downlink data to a first SGW when all the TAs belonging to the TAI list are included in the same SGW service area.

The UE may be switched from an RRC connected mode to an RRC idle mode before the PGW receives the downlink data.

The PGW may transmit a part of the buffered downlink data to an SGW.

The part of the buffered downlink data may be a first packet of the downlink data.

Upon receiving, from the MME, a message indicating that the UE has been switched to an RRC connected mode after transmitting a part of the buffered downlink data to a first SGW, the PGW may transmit the buffered downlink data to a second SGW.

The UE may move to the second SGW after being switched to an RRC idle mode.

When the PGW transmits a part of the buffered downlink data to the first SGW and then performs a session modification procedure, the PGW may transmit the buffered downlink data to a second SGW.

Whether all the TAs belonging to the TAI list are included in the same SGW service area may be indicated by information received from the MME.

Information received from the MME may be information received upon creation of a PDN connection.

Advantageous Effects

According to the present invention, it may be unnecessary to forward downlink data according to reselection of SGWu, and frequent change of SGWu may be efficiently coped with.

It will be appreciated by those skilled in the art that the effects that can be achieved through the embodiments of the present disclosure are not limited to those described above and other advantages of the present disclosure will be more clearly understood from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE

Figure 1:
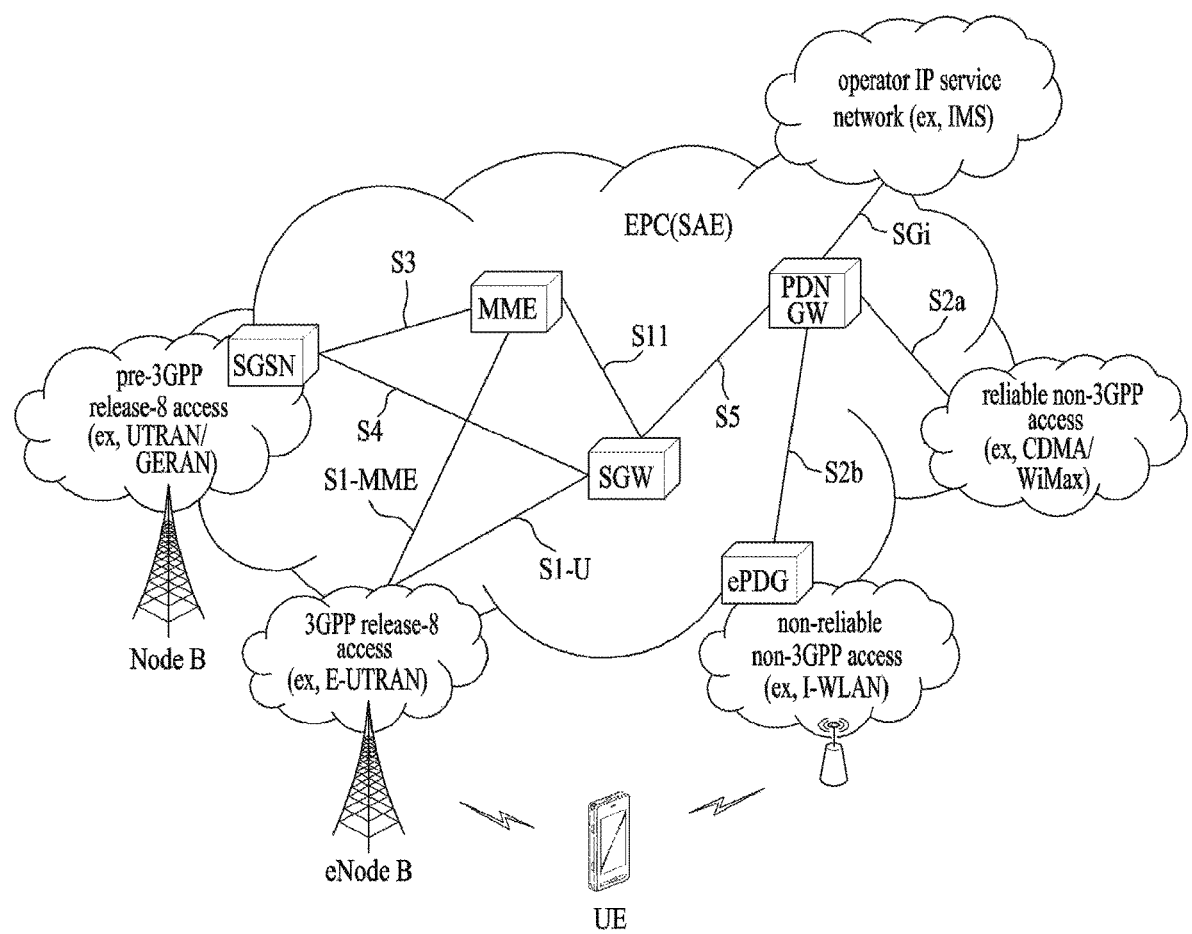
FIG. 1 is a diagram showing a schematic structure of an evolved packet system (EPS) including an evolved packet core (EPC).

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present invention is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal. ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one TP address (one TPv4 address and/or one Pv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data are exchanged through a direct data path without through a 3GPP core network (for example, EPC).

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a care network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
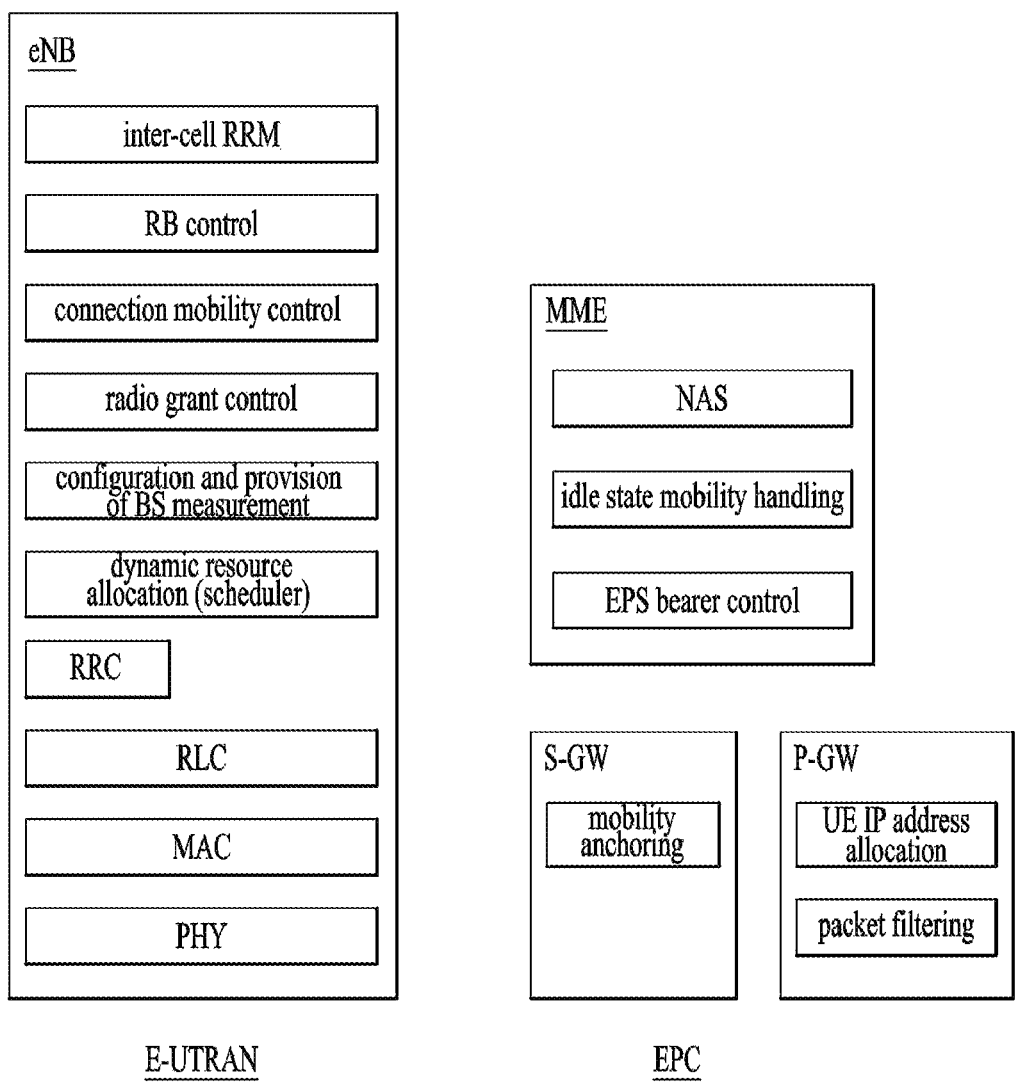
FIG. 2 is an exemplary diagram illustrating an architecture of a general E-UTRAN and an EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling: transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
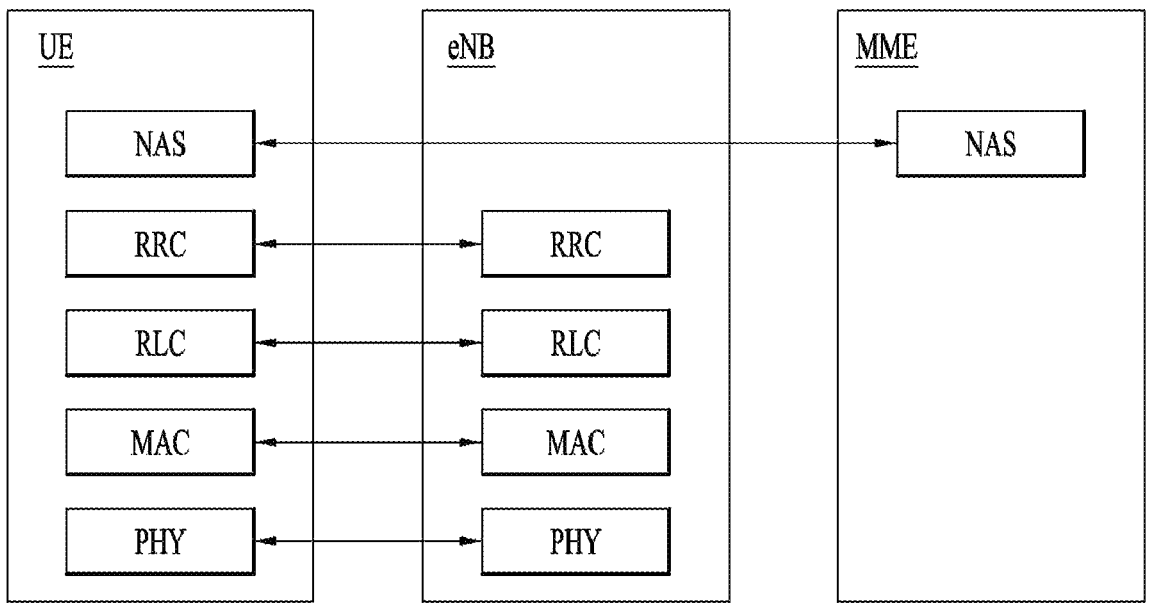
FIG. 3 is an exemplary diagram illustrating a structure of a wireless interface protocol in a control plane.
Figure 4:
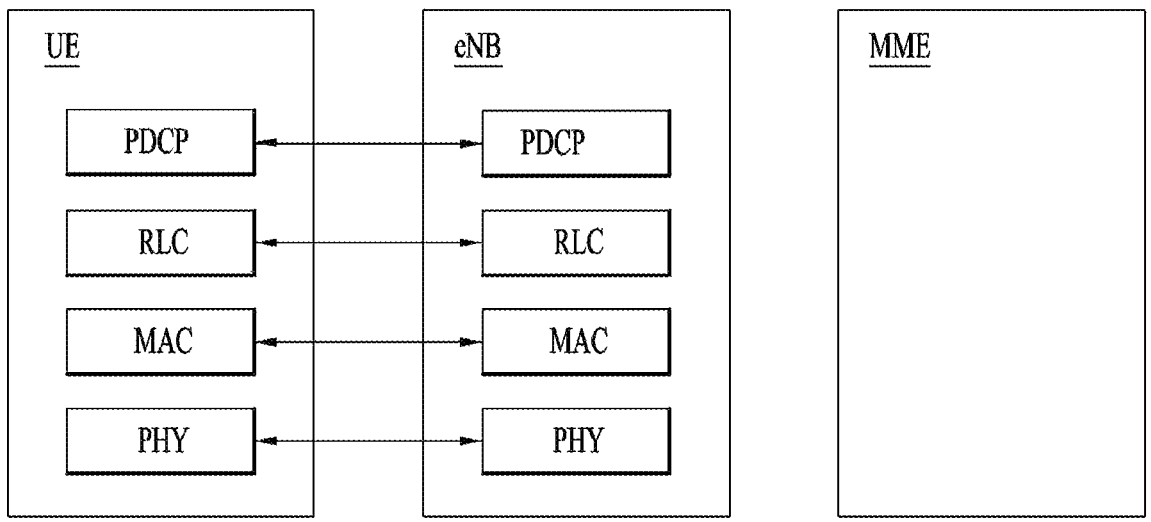
FIG. 4 is an exemplary diagram illustrating a structure of a wireless interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH). Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a stare in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAT through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
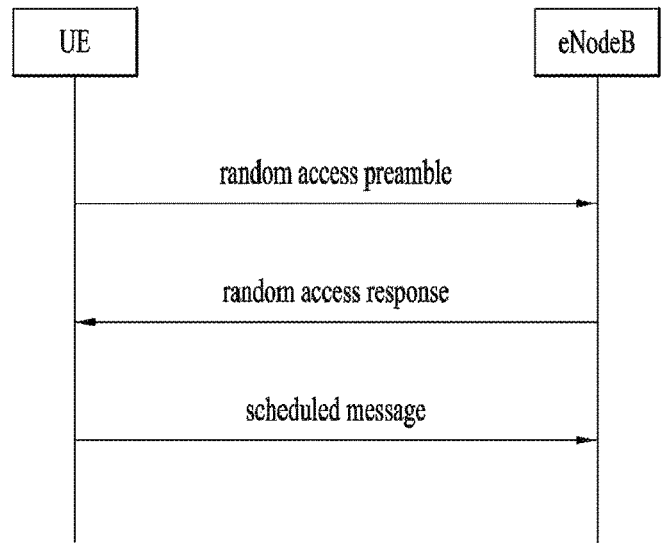
FIG. 5 is a flowchart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
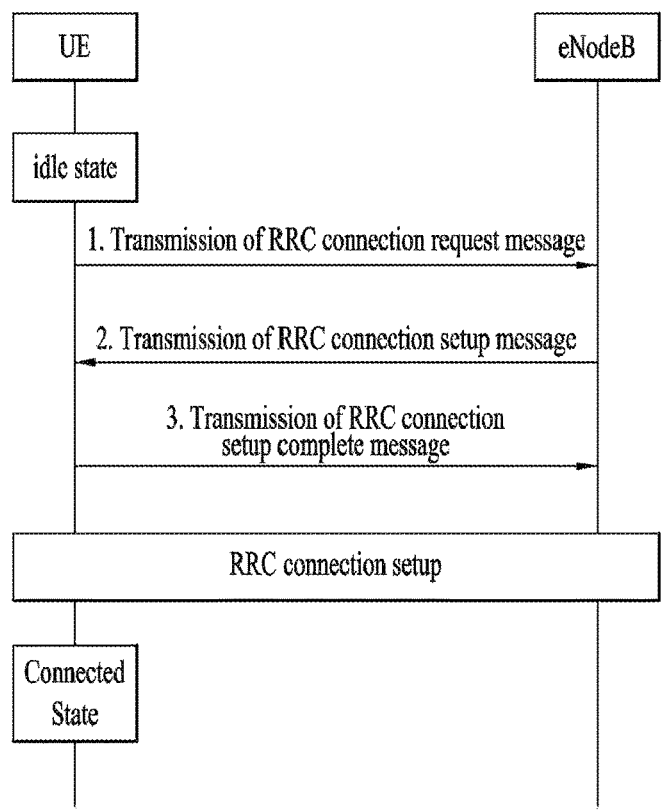
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a trucking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Recently, various types of wearable devices (such as smart watches) and IoT devices have emerged, and various service scenarios using such terminals have been introduced. For example, in a scenario, a wearable device may receive services from a network via a smartphone (that is, by using a smartphone as a relay) rather than being configured as a stand-alone device or directly connected to a mobile network to receive a service. This is because wearable devices and IoT devices have properties such as lower power capacity, lower RF capability, lower complexity, and lower cost, in comparison with a typical terminal such as a smartphone.

A terminal having a limited capacity and/or function compared to the typical terminal as described above may be referred to as a lightweight terminal. In the description of the present invention, it is assumed that the lightweight terminal does not perform a direct radio (or Access Stratum (AS)) operation toward the network. For example, in the case of E-UTRAN, it can be assumed that Uu-related operation is not performed. (However, the present invention is not limited thereto, and therefore may be applied even to a case where a lightweight terminal performs a direct radio (or Access Stratum (AS)) operation toward a network) A lightweight terminal is capable of performing a D2D operation (direct discovery, direct communication) with other UEs. In this operation, not only 3GPP radio such as E-UTRA but also non-3GPP radio such as Wi-Fi and Bluetooth may be used. A UE that provides a service of connection to a network for a lightweight terminal may be referred to as a relay UE. When the lightweight terminal receives the service of connection to the network through the relay UE, it may be called a remote UE.

Figure 7:
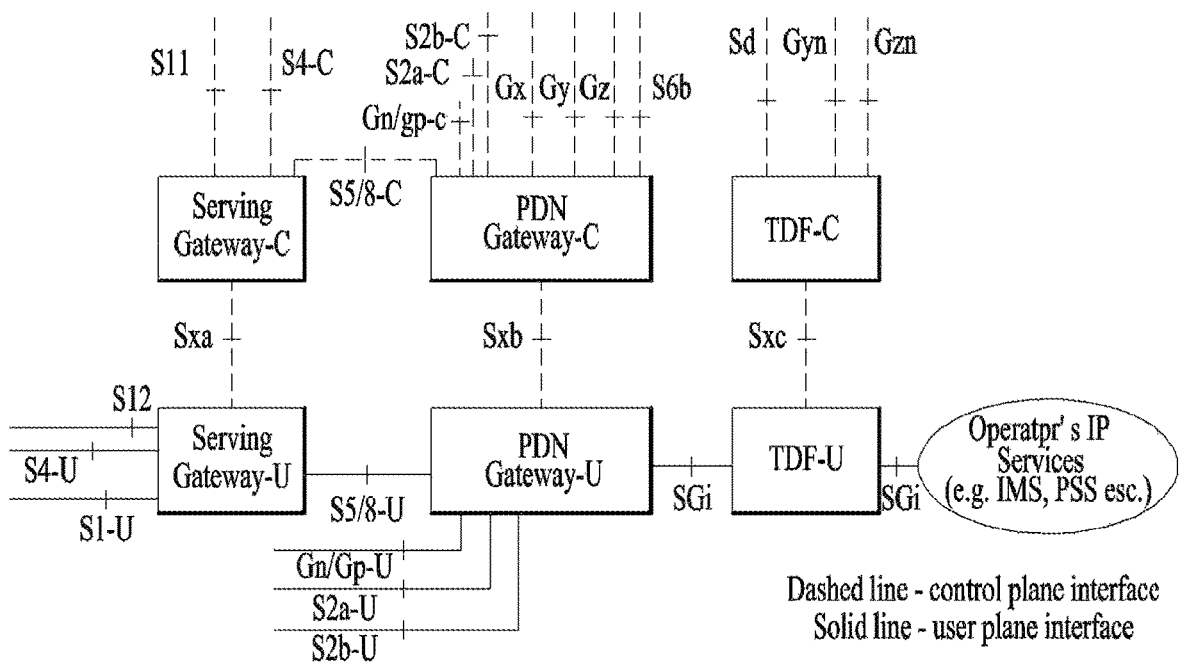
FIG. 7 shows a data path through an EPS.

Recently, a discussion is underway on how to separate the control plane and the user plane of the EPC node (see TR 23.714 for details). Such discussion is intended to separate the user plane functions from the control plane functions in the S-GW, P-GW and TDF of the EPC to implement flexible (i.e., distributed or centralized) network deployment and operation. The discussion handles i) functional separation of S-GW, P-GW and TDF into control plane and user plane functions while not affecting the overall functions provided by a node ii) reference points required between the user plane function and the separated control, plane of the S-GW, P-GW, TDF and a corresponding procedure, iii) various deployment scenarios that are essential in supporting separation of the S-GW. P-GW and TDF into control plane and flexible deployment of the separated control and user plane functions, iv) an interface that is essential in supporting separation of the S-GW, P-GW and TDF into control plane and user plane functions and an influence on other EPC entities. As a solution for separating the C-plane and the U-plane of the EPC nodes (in particular, SGW, PGW, TDF), the distributed structure illustrated in FIG. 7 referred to in TR 23.714 may be used.

If the GW (hereinafter referred to as GWc, SGWc, PGWc, etc.) serving as the C-plane and the GW (hereinafter referred to as GWu, SGWu, PGWu, etc.) serving as the U-plane are separated as described above, one GWc may control/manage one GWu, or may control/manage multiple GWus. In this case, GWus belonging to one GWc may provide service for an area smaller than the conventional one. In particular, in the case of an SGWu connected to the eNB, delay due to traffic transfer may be reduced by disposing the SGWu, which serves a small area, close to the eNB, that is, close to radio access.

Figure 8:
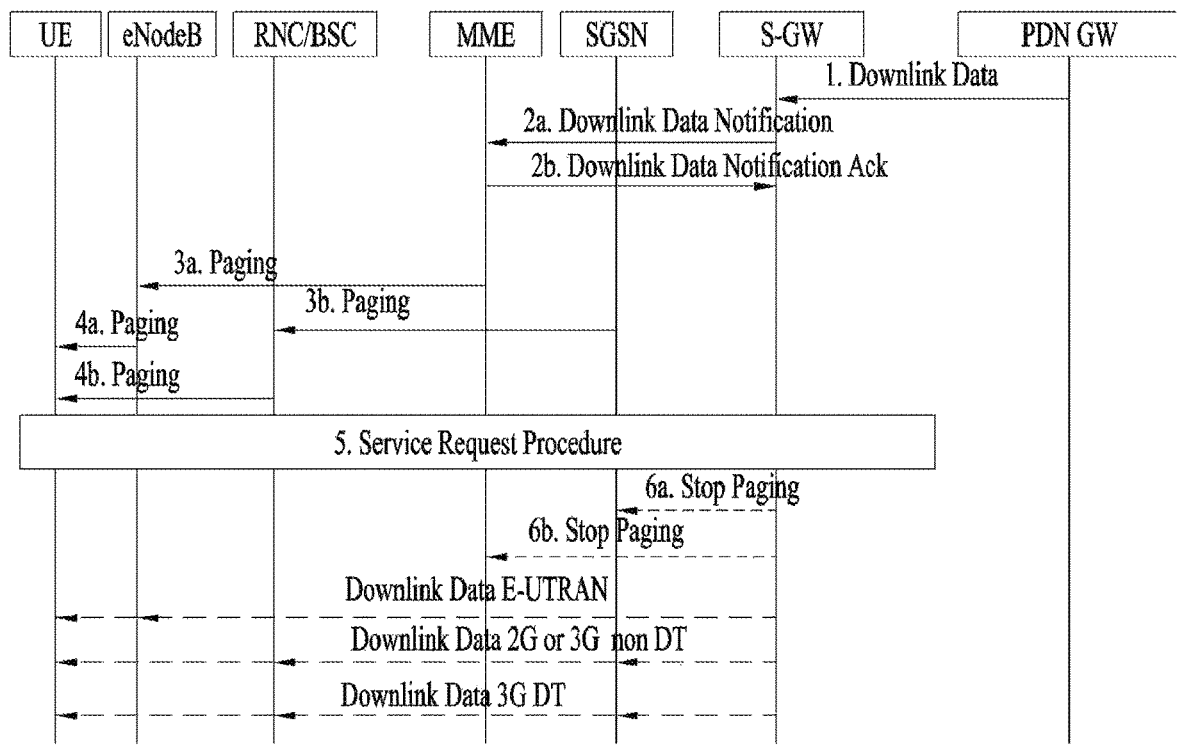
FIG. 8 is a diagram illustrating a procedure for transmitting downlink data to a UE via an S-GW in accordance with exemplary embodiments of the present invention.

Since an area served by one SGWu may become smaller than in conventional cases, switching to an SGWu capable of serving an area where the UE is located due to movement of the UE may more frequently occur. Particularly, in the case of a UE which makes frequent and fast movements like a vehicle in V2X (Vehicle-to-Everything), if the UE moves in the idle mode and leaves a service area of an SGWu selected for the UE, an appropriate SGWu must be reselected to provide a service when Mobile Originating (MO) or Mobile Terminating (MT) data is generated later. In this regard, if the UE moves in the idle mode and leaves the service area of the SGWu serving the UE, MT data may be generated for the UE, and a network triggered service request shown in FIG. 8 may be used for paging for the UE. Referring to FIG. 8, basically, whether the UE is in the idle mode or the connected mode is not known to the P-GW, and is managed by the S-GW. That is, if the S-GW has an S1-U with respect to the eND, the S-GW may consider the UE to be in the connected mode. Thus, the P-GW transmits the downlink data to the S-GW (step 1 of FIG. 8), and the S-GW sends a downlink data notification, which corresponds to a request for paging to the MME if the UE is in the idle mode (step 2a of FIG. 8). Then, the MME sends a paging message to the eNB, and the eNB sends the paging message to the UE. (For further details on FIG. 8, see Section 5.3.4.3 of TS 23.401.)

If an S-GW (an SGWu in the case where the C-plane and the U-plane are separated) is to be reselected when with the downlink data has already been received by the S-GW as in the paging procedure shown in FIG. 8, all the data received by the old SGWu must be transmitted to the new SGWu, and therefore data transmission may be delayed and the procedure may become complex. This issue will be discussed in more detail with reference to FIG. 9.

Figure 9:
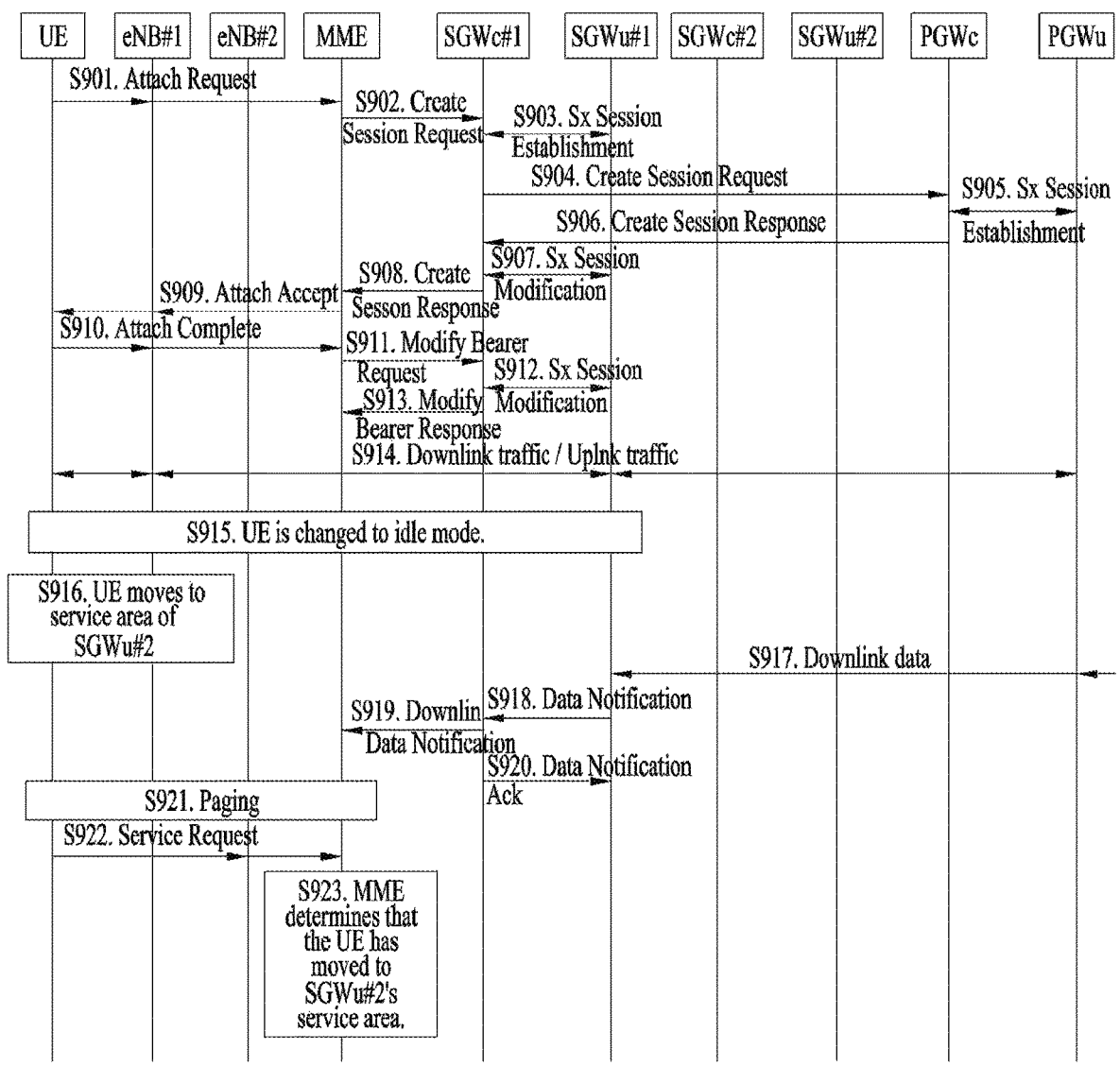
FIG. 9 illustrates an attach procedure in the case where the control plane function and the user plane function of network nodes are separated from each other.

FIG. 9 illustrates an attach procedure and a procedure of processing downlink data in the case where the control plane function and the user plane function of network nodes are separated from each other. While the MME is illustrated in FIG. 9 as recognizing the service area of each SGWu for simplicity, it may be interpreted as recognizing the service areas of the SWGus managed by each SGWc. That is, the case may be interpreted as meaning that it is the SGWc that directly controls the SGWu and the MME is capable of inferring the service area of the SGWu controlled by each SGWc by managing the information about the SGWcs. This interpretation is employed throughout the present invention.

Referring to FIG. 9, in step S901, the UE initiates the attach procedure by transmitting an Attach Request message. In step S902, the MME selects an SGWc and transmits a Create Session Request message to SGWc #1, which is the selected SGWc, to establish a PDN connection. In step S903. SGWc #1 selects SGWu #1 to perform session establishment. In step S904, the SGWc #1 transmits a Create Session Request message to the PGWc. In step S905, PGWc selects PGWu to perform a session establishment operation. In step S906, the PGWc sends a Create Session Response message to SGWc #1. In step S907, the SGWc #1 performs a session modification operation to notify the SGWu #1 of the F-TEIDu of the PGWu (the F-TEID of the GTP-u tunnel). In step S908, SGWc #1 transmits a Create Session Response message to the MME.

In step S909, the MME transmits an Attach Accept message to the UE. At this time, the MME adds Tracking Areas (TAs) served by multiple SGWus in configuring a TAI list that is to be provided to the UE. In the figure, it is assumed that a TAI list including TAs served by SGWu #1 and TAs served by SGWu #2 is configured and included in an Attach Accept message so as to be provided to the UE. In step S910, the UE transmits an Attach Complete message to the MME. In step S911, the MME transmits a Modify Bearer Request message to inform SGWc #1 of the F-TEIDu of the eNodeB. In step S912, SGWc #1 performs a session modification operation to inform SGWu #1 of the F-TEIDu of the eNodeB. In step S913, the SGWc #1 transmits a Modify Bearer Response message to the MMB. In step S914, downlink traffic and uplink traffic for the UE are transmitted via eNB #1, SGWu #1, and PGWu.

In step S915, the UE is switched from the connected mode to the idle mode. S1-U, that is, an S1 bearer formed between eNB #1 and SGWu #1, is released. In step S916, as the UE moves, it enters a service area served by the SGWu #2.

In step S917, the downlink data for the UE reaches the PGWu. The PGWu then transmits the downlink data to SGWu #1. In step S918, since the UE, which is the target of the downlink data, is in the idle mode, the SGWu #1 buffers the received data and transmits a Data Notification message to the SGWc #1 to notify the same of reception of the data. In step S919, the SGWc #1 transmits, to the MME, a Downlink Data Notification message for requesting paging. In step S920, the SGWc #1 transmits a Data Notification Ack message to the SGWu #1. In step S921, the MME performs a procedure of paging the UE. In step S922, the UE transmits a Service Request message in response to paging.

In step S923, the MME recognizes that the UE has moved to the area served by SGWu #2. Then, the MME should perform an operation to allow the S1 bearer to be created between eNB #2 and SGWu #2 and the PDN connection, which was previously established between SGWu #1 and the PGWu, to be established between SGWu #2 and the PGWu. However, as can been seen from step S917, the downlink data is already transmitted to the SGWu #1. In addition, the PGWu continues to transmit downlink data to SGWu #1 until it recognizes that the SGWu has been changed from SGWu #1 to SGWu #2. An additional procedure for transferring the data already transmitted to the SGWu #1 to the UE is required. Typically, SGWu #1 may be caused to forward the data to SGWu #2. In this case, however, the MME must instruct SGWu #1 to forward the data to SGWu #2 through the SGWc #1. In addition, complex operations such as an operation of informing SGWu #2 that data will be forwarded thereto from another SGWu through SGWc #2 are required.

Hereinafter, an operation method of network nodes for addressing the issue described above will be described.

Embodiment

First, an embodiment of the present invention will be described in terms of a PGW for processing data for a UE, and then overall operations of each network node will be described with reference to FIG. 10.

The PGW receiving a tracking area identifier (TAI) list provided from the MME to the UE may receive downlink data for the UE from the network. Here, if not all the Tracking Area (TAs) belonging to the TAI list are included in the same serving gateway (SGW)/Serving gateway user-plane (SGWu) service area, the PGW should (may) buffer the DL data. Alternatively, if a TAI list configured by the MME so as to be provided to the UE includes TAs served by multiple SGWu's, the PGW should (may) buffer the downlink data. Alternatively, if a restriction that a TAI list should be configured and applied to only an area served by the serving SGWn is not applied, the PGW should (may) buffer downlink data. Alternatively, if there is no restriction that "All Tracking Areas in the Tracking Area List belong to the same Serving GW service area", the PGW should (may) buffer downlink data. The PGW may be a PGW (i.e., PGWu) that performs only the user plane function between the control plane and the user plane. If all TAs belonging to the TAI list are included in the same SGWu service area, the PGW may transmit the downlink data to a first SGW (first SGWu).

Subsequently, the PGW may transmit a portion of the buffered downlink data to the SGWu. Here, the portion of the buffered downlink data may be the first user packet of the downlink data.

The UE may be switched from the RRC connected mode to the RRC idle mode before the PGW receives the downlink data. If the PGW receives, from the MME, a message indicating that the UE has switched to the RRC connected mode after the PGW transmits a portion of the downlink data to the first SGW, it may transmit the buffered downlink data to a second SGW (second SGWu). Alternatively, if the PGW performs a session modification procedure after transmitting a portion of the buffered downlink data to the first SGW, it may transmit the buffered downlink data to the second SGW.

Here, the UE may have moved to the service area of the second SGW after switching to the RRC idle mode. The detailed operation of the network nodes other than the PGW performed until the PGW receives, from the MME, a message indicating that the UE has switched to the RRC connected mode after transmitting a portion of the buffered downlink data to the first SGW will be described later with reference to FIG. 10

Whether all the TAs belonging to the TAI list are included in the same SGW service area may be indicated by the information received from the MME. Here, the information received from the MME may have been received at the time of creating a PDN connection.

As described above, if not all the TAs belonging to the TAI list are included in the same SGW service area in a network environment in which the user plane and the control plane of the network nodes are separated from each other, the PGW may buffer the downlink data, thereby addressing the issue described above (the issue of requiring the SGW having received the user data from the PGW to forward the data).

Hereinafter, operation of each network node according to an embodiment of the present invention will be described with reference to FIG. 10. The contents disclosed in 3GPP TS 23.401, TS 23.214 may be referred to as long as they are not inconsistent with the description given below.

Figure 10:
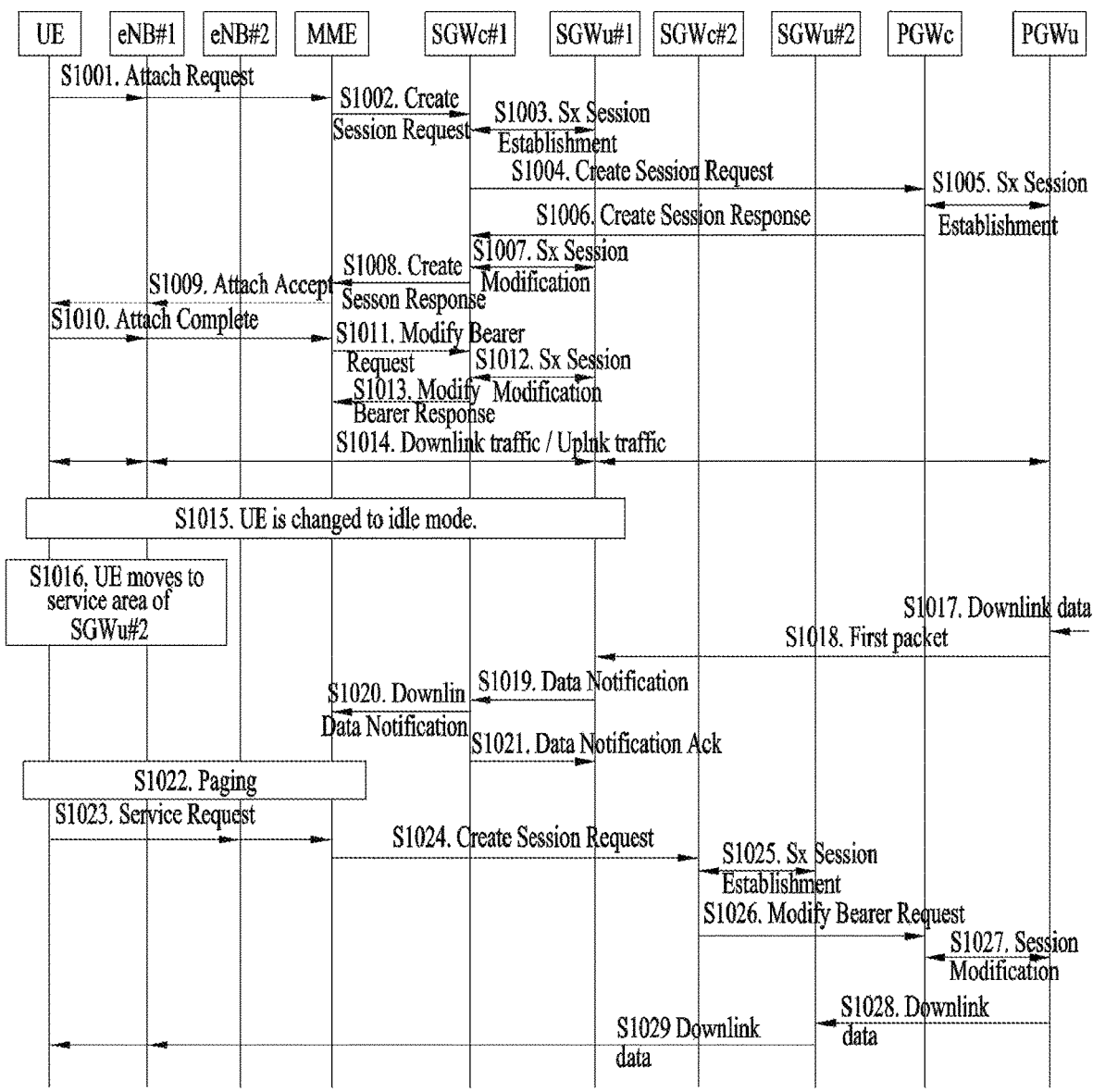
FIG. 10 is a diagram illustrating an embodiment of the present invention.

In FIG. 10, steps S1001 to S1016 are basically the same as steps S901 to S916 in FIG. 9. However, step S1002 includes information indicating that a TAI list is to be configured including TAs served by multiple SGWus for the UE (information indicating that a restriction that the TAI list configuration is applied to only the area served by one SGWu is not applied, information indicating that not all TAs belonging to the TAI list are included in the same SGWu service area, or information indicating that the restriction that "all Tracking Areas in the Tracking Area List belong to the same Serving GW service area" is not applied). This information may be transferred to the PGWu through steps S1004 to S1005.

In step S1017, the downlink data for the UE reaches the PGWu. The PGWu buffers all the downlink data. Here, the buffering may be performed in accordance with the information received in step S1005, the characteristics of the TAI list, and the like. That is, if not all TAs belonging to the TAI list are included in the same SGWu service area, the PGWu should (may) buffer the downlink data. Alternatively, if a TAI list configured by the MME so as to be provided to the UE includes TAs served by multiple SGWus, the PGWu should (may) buffer the downlink data. Alternatively, if a restriction that a TAI list should be configured and applied only to an area served by the serving SGWu is not applied, the PGWu should (may) buffer downlink data. Alternatively, if there is no restriction that "all Tracking Areas in the Tracking Area List belong to the same Serving GW service area", the PGWu should (may) buffer downlink data.

In step S1018, the PGWu transmits a first packet of the received downlink data to SGWu #1. In step S1019, SGWu #1 buffers the received data and transmits a Data Notification message to SGWc #1 to notify the same of reception of the data. That is, the SGWu notifies the SGWc which controls/manages the SGWu that it has the downlink data. This message may refer to a message for making a paging request. Thereafter, the SGWu does not transmit the packet to the UE even if it recognizes that the UE is in the connected mode. That is, the SGWu may discard the received packet. The timing of discarding the received packet may vary. For example, the SGWu may discard the received packet after receiving a response to the paging request after the UE is switched to the connected mode, after S1-U with respect to the eNB is generated, after a certain time passes after the paging request is made, or after receiving, from the MME or SGWc, a message/information instructing deletion of the packet.

In step S1020, the SGWc #1 transmits, to the MME, a Downlink Data Notification message for requesting paging. That is, the SGWc informs the MME that it has downlink data. This message may refer to a message for making a paging request. In addition, this operation may be an operation of the conventional S-GW transmitting a DDN message to the MME (see Section 5.3.4.3 of TS 23.401 in this regard). In step S1021, SGWc #1 transmits a Data Notification Ack message to SGWu #1. Then, SGWu #1 may delete the first packet for the UE received from the PGWu.

In step S1022, the MME performs a procedure of paging the UE. The UE is switched to the connected mode. In this regard, the operation of Section 5.3.4.3 of TS 23.401 may be applied mutatis mutandis. If the SGWu that has served the UE cannot serve the UE any longer, a SGWu capable of serving the UE is reselected.

In step S1023, the UE transmits a Service Request message in response to paging. When the UE is switched to the connected mode, the MME informs PGWu that the UE has been switched to the connected mode. This operation may be performed explicitly or implicitly. If there is a message to be sent to the PGWu (for other purposes), the aforementioned information may be added to the message, or the message itself may implicitly indicate that the UE has been switched to the connected mode. If it is not necessary to send the message to the PGWu (for other purposes), a message may be transmitted to deliver the information. This message may be transmitted along a path through the MME, the SGWc, the PGWc and the PGWu. If there is an interface between the MME and the PGWc, the message may be transmitted without being relayed by the SWGc in the middle. That is, the message transmission path may vary depending on the type of connection of nodes/functions. In step S1024, the MMB recognizes that the UE has moved to an area served by SGWu #2. Thus, the MME transmits a Create Session Request message to SGWc #2 configured to control SGWu #2. In step S1025. SGWc #2 performs session establishment together with SGWu #2. In step S1026, SGWc #2 transmits a Modify Bearer Request message to the PGWc. This is intended to indicate that SGWu #2 is a new SGW.

In step S1027, the PGWc performs a session modification operation to provide information about SGWu #2 to the PGWu. Then, the PGWu may recognize that the UE is switched to the connected mode. In addition, the PGWu may recognize that it should transmit the buffered data to an SGWu. Alternatively, the PGWu may recognize that the UE is in the connected mode upon receiving, from the MME, a message indicating that the UE has switched to the RRC connected mode. In step S1028, the PGWu transmits the buffered downlink data to SGWu #2. In step S1029, SGWu #2 transmits data to the eNB #2 through the S1-U connection, and the transmitted data is relayed to the UE. Although not shown in FIG. 10, since the MME performs an operation to establish the S1-U connection between eNB #2 and SGWu #2, SGWu #2 may be allowed to transmit data to eNB #2.

The procedure of FIG. 10 may be based on the premise that the UE is in the RRC idle mode. If the UE is in the RRC connected mode, the SGWu explicitly or implicitly notifies the PGWu that the UE in the connected mode. This may mean a message that causes the PGWu to transmit downlink data. This message may be transmitted along a path through the SGWu, the SGWc, the PGWc and the PGWu. If there is an interface between the SGWu and the PGWc, the message may be transmitted without being relayed by the SWGc in the middle. The message transmission path may vary depending on the type of connection of nodes/functions. The MME may explicitly/implicitly inform the PGWu that the UE is in the idle mode. This operation may be interpreted as informing the PGWu that the PGWu should buffer downlink data destined for the UE upon receiving the data. Alternatively, it may be interpreted as informing the PGWu that the PGWu should not transmit all the downlink data destined for the UE to the SGWu. This operation may be performed as part of Section 5.3.5 (S1 release procedure) of TS 23.401. The reason for which the MME informs the PGWu that the UE is in the idle mode when the UE is in the idle mode as described above is absence of the restriction that "the Serving GW selection function in the MME is used to ensure that all Tracking Areas in the Tracking Area List belong to the same Serving GW service area". The message indicating the information above may be transmitted along a path through the MME, the SGWc, the PGWc and the PGWu. If there is an interface between the MME and the PGWc, the message may be transmitted without being relayed by the SWGc in the middle. As such, the message transmission path may vary depending on the type of connection of nodes/functions. When the PGWu receives the message and receives downlink data destined for the UE, step S1018 in FIG. 10 is performed. The subsequent operations are the same as the operation of S1019 of FIG. 10 and subsequent operations. On the other hand, if the PGWu has not received the message, that is, a message indicating that the UE is in the idle mode, the PGWu transmits the downlink data destined for the UE to the SGWu upon receiving the same.

It has been described above that the SGWu discards a packet (i.e., the first packet of the downlink data) received from the PGWu rather than transmitting the same to the UE, and PGWu transmits all the packets to the UE. However, if the serving SGWu of the UE has not been changed (i.e., reselection has not been performed), the SGWu may transmit the received packet to the UE, and the PGWu may transmit packets to the UE except for the first packet transmitted to the SGWu. Although SGW and PGW have been described above, embodiments are not necessarily limited to specific network node names. For example, the SGW (particularly, SGWu) may be a GW located close to radio access, and the PGW (particularly, PGWu) may be a GW connected to PDN.

Figure 11:
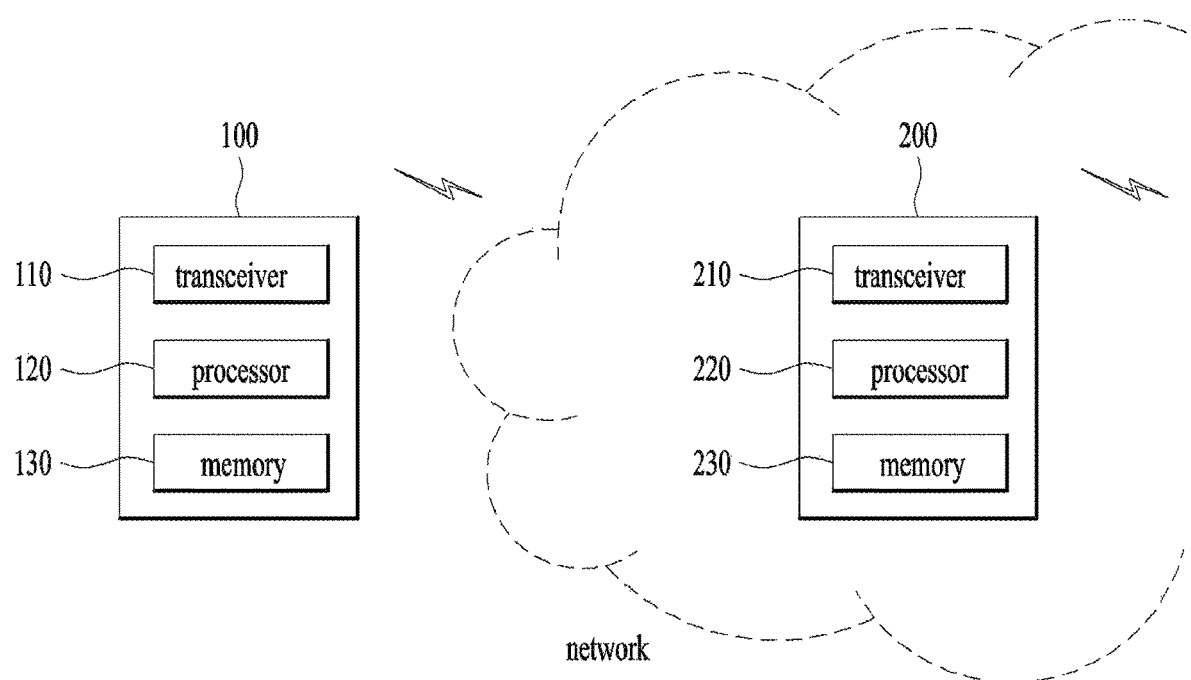
FIG. 11 is a diagram illustrating a configuration of a node according to an embodiment of the present invention.

FIG. 11 is a diagram illustrating a configuration of a UE and a network node according to a preferred embodiment of the present invention.

Referring to FIG. 11, the UE 100 according to the present invention may include a transceiver 110, a processor 120, and a memory 130. The transceiver 110 may be configured to transmit and receive various signals, data and information to and from an external device. The UE 100 may be connected to the storage device by wire and/or wirelessly. The processor 150 may control overall operation of the UE 100, and be configured to calculate and process information for the UE 100 to transmit to and receive from the external device. In addition, the processor 120 may be configured to perform the proposed operations of the UE. The memory 130 may store the calculated and processed information for a predetermined time, and may be replaced by another constituent such as a buffer (not shown).

Referring to FIG. 11, the network node 200 according to the present invention may include a transceiver 210, a processor 220 and a memory 230. The transceiver 210 may be configured to transmit and receive various signals, data and information to and from an external device. The network node 200 may be connected to the storage device by wire and/or wirelessly. The processor 220 may control overall operation of the network node 200, and be configured to calculate and process information for the network node 200 to transmit to and receive from the external device. In addition, the processor 220 may be configured to perform the proposed operations of the network node. The memory 230 may store the calculated and processed information for a predetermined time, and may be replaced by another constituent such as a buffer (not shown).

For configuration of the UE 100 and the network apparatus, the details described in various embodiments of the present invention may be independently applied or implemented such that two or more embodiments are simultaneously applied. For simplicity, redundant description is omitted.

The embodiments of the present invention may be implemented through various means. For example, the embodiments may be implemented by hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, and the like.

When implemented by firmware or software, a method according to embodiments of the present invention may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit and scope of the invention disclosed in the appended claims. Thus, the present invention is not intended to be limited to the embodiments described herein, but is intended to accord with the widest scope corresponding to the principles and novel features disclosed herein.

INDUSTRIAL APPLICABILITY

Although embodiments of the present invention have been described above focusing on the 3GPP system, they are applicable to various mobile communication systems in the same manner.

The invention claimed is:

1. A method for processing data for a user equipment (UE) by a packet data network gateway (PGW) in a wireless communication system, the method comprising:
   receiving a tracking area identifier (TAI) list from a mobility management entity (MME); and
   receiving downlink data for the UE in an RRC (Radio Resource Control) idle mode from a network,
   wherein not all tracking areas (TAs) belonging to the TAI list are included in a same serving gateway (SGW) service area, the method further comprises:
   buffering the downlink data; and
   transmitting the downlink data to a first SGW based on the UE switching from the RRC idle mode to an RRC connected mode,
   wherein all the TAs belonging to the TAI list are included in the same SGW service area and the UE is in the RRC idle mode, the method further comprises transmitting the downlink data to the first SGW, and
   wherein the UE is located in a service area of the first SGW.

2. The method according to claim 1, wherein the PGW performs only a function of a user plane between a control plane and the user plane.

3. The method according to claim 1, further comprising:
   transmitting a part of the downlink data to the first SGW wherein not all the TAs belonging to the TAI list are included in the same SGW service area and the UE is in the RRC idle mode; and
   transmitting the whole downlink data to the first SGW based on the UE switching from the RRC idle mode to the RRC connected mode.

4. The method according to claim 3, wherein the part of the downlink data is a first packet of the downlink data.

5. The method according to claim 1, further comprising:
   wherein not all TAs belonging to the TAI list are included in the same service area and the UE in the RRC idle mode is located in a service area of a second SGW,
   transmitting a part of the downlink data to the second SGW, and
   transmitting the whole downlink data to the first SGW based on the UE's moving to the service area of the first SGW from the service area of the second SGW.

6. The method according to claim 5,
   wherein the PGW performs a session modification procedure after transmitting part of the downlink data to the second SGW, and
   wherein the PGW performs the session modification procedure to provide information regarding the first SGW to a user plane of the PGW.

7. The method according to claim 1, further comprising:
   receiving, from the MME, information regarding whether all the TAs belonging to the TAI list are included in the same SGW service area.

8. The method according to claim 7, wherein, the PGW receives information based on creation of a PDN connection.

9. A packet data network gateway (PGW) for processing data for a user equipment (UE) in a wireless communication system, the PGW comprising:

a transceiver; and a processor that:

receives, through the transceiver, a tracking area identifier (TAI) list from an MME and downlink data for the UE in an RRC (Radio Resource Control) idle mode from a network, wherein not all tracking areas (TAs) belonging to the TAI list are included in a same serving gateway (SGW) service area, the processor further:

buffers the downlink data, and transmits, through the transceiver, the downlink data to a first SGW based on the UE switching from the RRC idle mode to an RRC connected mode, wherein all the TAs belonging to the TAI list are included in the same SGW service area and the UE is in the RRC idle mode, the processor transmits, through the transceiver, the downlink data to the first SGW, and wherein the UE is located in a service area of the first SGW.

\* \* \* \* \*